United States Patent [19]

Uemura et al.

[11] Patent Number: 5,768,497
[45] Date of Patent: Jun. 16, 1998

[54] EMULATOR MICROCOMPUTER UNIT

[75] Inventors: Kin-ichi Uemura; Toshihiko Sugahara, both of Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 678,587

[22] Filed: Jul. 12, 1996

[30] Foreign Application Priority Data

Feb. 19, 1996 [JP] Japan .................... 8-030838

[51] Int. Cl.⁶ .................................... G06F 11/22
[52] U.S. Cl. ................................... 395/183.04
[58] Field of Search ............... 395/183.04, 183.03, 395/183.01; 364/232.2, 927.81; 340/656; 361/735; 439/55

[56] References Cited

U.S. PATENT DOCUMENTS

| | | | |
|---|---|---|---|
| 4,796,258 | 1/1989 | Boyce et al. | 371/16 |
| 4,901,259 | 2/1990 | Watkins | 364/578 |
| 5,228,039 | 7/1993 | Knoke et al. | 371/19 |
| 5,526,275 | 6/1996 | Enomoto | 364/488 |
| 5,537,536 | 7/1996 | Groves | 395/183.04 |
| 5,571,021 | 11/1996 | Kawabe et al. | 439/71 |
| 5,572,665 | 11/1996 | Nakabayashi | 395/183.04 |
| 5,581,695 | 12/1996 | Knoke et al. | 395/183.04 |
| 5,640,337 | 6/1997 | Huang et al. | 364/578 |

FOREIGN PATENT DOCUMENTS

| | | | |
|---|---|---|---|
| 3214082 | 9/1991 | Japan | G01R 31/28 |
| 5181695 | 7/1993 | Japan | G06F 11/22 |
| 7146803 | 6/1995 | Japan | G06F 11/22 |

*Primary Examiner*—Robert W. Beausoliel, Jr.
*Assistant Examiner*—Stephen C. Elmore
*Attorney, Agent, or Firm*—Leydig, Voit & Mayer, Ltd.

[57] ABSTRACT

An emulator microcomputer unit has a plurality of semi-cylindrical through-holes around the periphery of a substrate of the emulator MCU. L-shaped connection terminals or pins are electrically connected to the semi-cylindrical through-holes. A foot print defined by the connection terminals is equivalent to or corresponds to a foot print defined by connection terminals of an OTP or flash microcomputer IC to be used during a final test operation. The microcomputer IC chip and the connector for connecting the unit to the emulator may be mounted on the same or on opposing surfaces of the substrate.

17 Claims, 10 Drawing Sheets

EMULATOR MICROCOMPUTER UNIT

BACKGROUND OF THE INVENTION

1. Field of the Invention

The present invention relates to an in-circuit emulator (hereinafter referred to as "emulator") for use in program developments of microcomputer integrated circuits (hereinafter referred to as "microcomputer IC"), and more particularly, it relates to a microcomputer unit for use in an emulator that is connected instead of a microcomputer IC while the microcomputer IC is debugged by using the emulator.

2. Description of the Prior Art

In microcomputer system development, an emulator whose operation is equal to a target microcomputer IC to be incorporated in a microcomputer system is usually used in order to debug the operations of programs to be stored in the microcomputer system. In this case, a microcomputer unit for use in an emulator (hereinafter referred to as "an emulator MCU") is connected to the microcomputer system to be the target instead of the microcomputer which is incorporated into the microcomputer system after debugging operations and signals for debugging operations are transferred from the emulator MCU to the emulator in order to evaluate the programs.

FIG. 1 is a diagram showing a side view of a conventional emulator MCU. In the diagram, reference number 1 designates an emulator MCU, reference number 2 denotes a microcomputer IC sealed with a ceramic package. Reference number 3 indicates a socket of an emulator (not shown) mounted on the microcomputer IC 2 sealed with the ceramic package, through which the emulator is connected to the microcomputer IC 2 sealed with the ceramic package. As shown in FIG. 1, the socket 3 used for the connection to the emulator (not shown) is mounted on the surface of the microcomputer IC 2 sealed with the ceramic package so that the debugging signals are transferred from the microcomputer IC to the socket 3 with printed wiring through which the socket 3 is electrically connected to the microcomputer IC.

Next, the operation of the conventional emulator MCU will be explained.

A part of the microcomputer IC 2 in the emulator MCU 1 is plugged into a socket in a user-target substrate and then an MCU plug (not shown) of the emulator is connected to the socket 3 of the emulator MCU 1. Thereby, debugging signals are transferred from the microcomputer IC 2 sealed with the package to the emulator (not shown).

Recently, the size of emulator connection socket 3 to which an MCU plug for use in the emulator is plugged has become greater than the size of the surface of the microcomputer IC 2 sealed with the ceramic package due to the miniaturization of microcomputer ICs. In order to fit them, a pin arrangement changeable substrate or a socket mount substrate used for mounting the emulator connection socket is introduced or another component whose size is greater than that of the microcomputer IC 2 is mounted on the microcomputer IC 2 sealed with the ceramic package.

FIG. 2 is a perspective view showing a case wherein the emulator (not shown) is connected to the emulator MCU by using the pin arrangement changeable substrate.

In the diagram, reference number 4 designates a user-target substrate such as a control system, reference number 5 denotes a lead chip carrier socket (hereinafter referred to as an "LCC socket") mounted on the user-target substrate 4, reference number 6 indicates the emulator MCU to be connected to the LCC socket 5, reference number 7 designates a pin arrangement changeable substrate to be connected to the emulator MCU 6, and a reference number 8 denotes the MCU plug to be connected to the changeable pin arrangement substrate 7. The MCU plug 8 is connected to the emulator (not shown) through a flat cable 81. In this example, as shown in FIG. 2, like the case as shown in FIG. 1, signals are transferred between the emulator (not shown) and the emulator MCU 6 in order to debug the programs.

FIG. 3 is a side view showing an emulator MCU with a socket mount substrate. In the diagram, reference number 9 designates an emulator MCU, reference number 10 denotes a microcomputer IC sealed with a ceramic package, reference number 11 indicates an emulator socket through which the emulator MCU 9 is connected to the emulator (not shown), and reference number 12 designates a mounting substrate placed on the microcomputer IC 10 for mounting the emulator socket 11.

FIG. 4 is a side view showing an emulator MCU in which another component whose size is greater than the size of the upper surface section of a microcomputer IC 14 in area is mounted on the microcomputer IC 14. In the diagram, a reference number 13 designates an emulator MCU, reference number 14 denotes the microcomputer IC, reference number 15 indicates a socket mounting component whose bottom surface is greater in area than the upper surface of the microcomputer 14, reference number 16 denotes an emulator connection socket for use in the emulator (not shown). As shown in the diagram, the emulator connection socket 16 is mounted on the upper surface section of the socket mounting component 15 placed on the upper surface section of the microcomputer IC 14.

In the cases illustrated in FIGS. 2 to 4 described above, the emulator MCUs 6, 9 and 13 as unstable because the center of gravity of each of the emulator MCUs 6, 9 and 13 is high in position.

Recently, many of quad-flat-package (hereinafter referred to as "QFP") type microcomputer ICs of a small size are used during a final operation test.

FIG. 5 is a diagram showing the relationship between the width of the emulator MCU 1 as shown in FIG. 1, the width of an LCC socket, and the width of the QFP microcomputer IC mounted in the final operation test in order to evaluate programs.

In the diagram, reference number 17 designates the LCC socket mounted on a user-target substrate, and reference number 18 indicates a QFP microcomputer IC mounted only for the final test operation.

As shown in the diagram, the width A of the QFP microcomputer IC 18 is narrower than the width B of the emulator MCU 1 and the width C of the LCC socket 17 is wider of the width B of the emulator MCU 1. For this reason, the QFP microcomputer IC 18 is considerably smaller than the LCC socket 17 in width. Accordingly, in a layout design of a substrate, designers should take into consideration mounting both the LCC socket 17 and the QFP socket for the QFP microcomputer IC 18. It therefore takes a lot of time in design. In addition, when operation errors happen after the QFP microcomputer IC 18 is mounted on the QFP socket, the QFP socket should be taken away and then the LCC socket 17 should be mounted again.

FIG. 6 is a diagram showing connection possibility states between various type microcomputers and the emulator MCU 6 and the LCC socket 5. The components which are also used in FIG. 2 are indicated by the same reference numbers and the explanation of them is omitted here for concise explanation.

As shown in FIG. 6, the emulator MCU 6 sealed with the ceramic package and the microcomputer of EPROM type can be directly connected, namely, easy to connect (possible to connect or connectable), to the LCC socket 5. On the other hand, a microcomputer of one-time programmable type (hereinafter referred to as "OTP type microcomputer") and a flash type microcomputer can not be directly connected, namely, difficult to connect (difficult to connect or unconnectable), to the LCC socket 5. Accordingly, when the program development operations such as debugging is performed by using the emulator MCU and the EPROM type microcomputer and the final test operation is executed by using the OTP type microcomputer or the flash type microcomputer, the LCC socket 5 is taken away and then the QFP socket (not shown) should be mounted for the OTP type microcomputer or the flash type microcomputer.

Because the conventional emulator MCU has the configuration described above, designers should take into consideration mounting microcomputers used in the final test evaluation operation whose shapes are different from that of the emulator MCU which is used in program development operations. Specifically, when errors are detected in the final evaluation in the final test operation, the QFP socket should be taken away and the LCC socket is mounted again by soldering. That is, it takes a lot of time, which is a problem.

SUMMARY OF THE INVENTION

Accordingly, an object of the present invention is, with due consideration to the drawbacks of the conventional emulator MCU, to provide an emulator MCU at low manufacturing cost which is capable of easily performing program developments such as debugging operations for programs.

In accordance with one preferred embodiment of the present invention, an emulator MCU (Micro-Computer Unit) for connecting a user target substrate to an emulator in order to transfer debugging signals to the emulator, comprise an emulator MCU substrate having a plurality of electrical connection terminals for a microcomputer IC (Integrated Circuit), an arrangement of a foot pattern of the emulator MCU corresponding to an arrangement of a foot pattern of a plurality of electrical connection terminals of a microcomputer IC having a predetermined shaped to be mounted on the user target substrate, a microcomputer IC chip, whose operation is equal to the operation of the microcomputer IC mounted on the user target terminal, mounted on a surface of the emulator MCU substrate, a connector mounted on the surface of the emulator MCU substrate for electrically connecting the emulator to the microcomputer IC chip, and printed wiring formed on the surface of the emulator MCU substrate for electrically connecting the plurality of electrical connection terminals, the microcomputer IC chip, and the connector.

In the emulator MCU of the embodiment of the present invention described above, the emulator MCU substrate includes a first surface mount section that faces the user target substrate and a second surface mount section that does not face the user target substrate when the emulator MCU substrate is connected to the user target substrate, and the microcomputer IC chip is mounted on the first surface mount section and the connector is mounted on the second surface mount section.

In addition, in the emulator MCU of the embodiment of the present invention described above, the emulator MCU substrate having a first surface mount section that is faces to the user target substrate and a second surface mount section that does not face the user target substrate when the emulator MCU substrate is connected to the user target substrate, and the microcomputer IC chip and the connector are mounted on the second surface mount section.

Further, in the emulator MCU of the embodiment of the present invention described above, the first surface mount section has a concave section and the microcomputer IC chip is placed in the concave section.

Moreover, in the emulator MCU of the embodiment of the present invention described above, a plurality of semi-cylindrical through-holes are formed around a peripheral section of the emulator MCU substrate so that an arrangement of a foot pattern of the semi-cylindrical through-holes corresponds to an arrangement of a foot pattern of the plurality of electrical connection terminals of the microcomputer IC chip to be mounted on the user target substrate, and the plurality of L shaped pins as the plurality of electrical connection terminals are electrically connected to the plurality of semi-cylindrical through-holes.

In addition, in the emulator MCU of the embodiment of the present invention described above, an electrically erasable ROM (read only memory) or an ultra-violet erasable ROM as the microcomputer IC chip is mounted on the emulator MCU substrate.

Further, in the emulator MCU of the embodiment of the present invention described above, the microcomputer IC chip is electrically connected to the connector through through-holes penetrating through the emulator MCU substrate.

In addition, in the emulator MCU of the embodiment of the present invention described above, the emulator MCU substrate is made of glass epoxy material.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, various preferred embodiments of the present invention will be explained with reference to the accompanying drawings.

Embodiment 1

Figure 1:
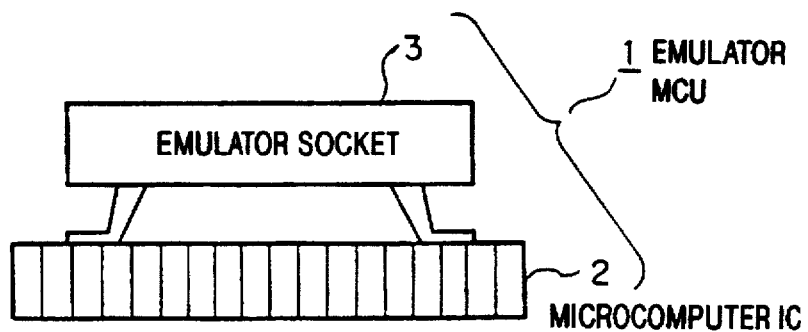
FIG. 1 is a side view showing a conventional emulator Microcomputer unit (MCU).
Figure 2:
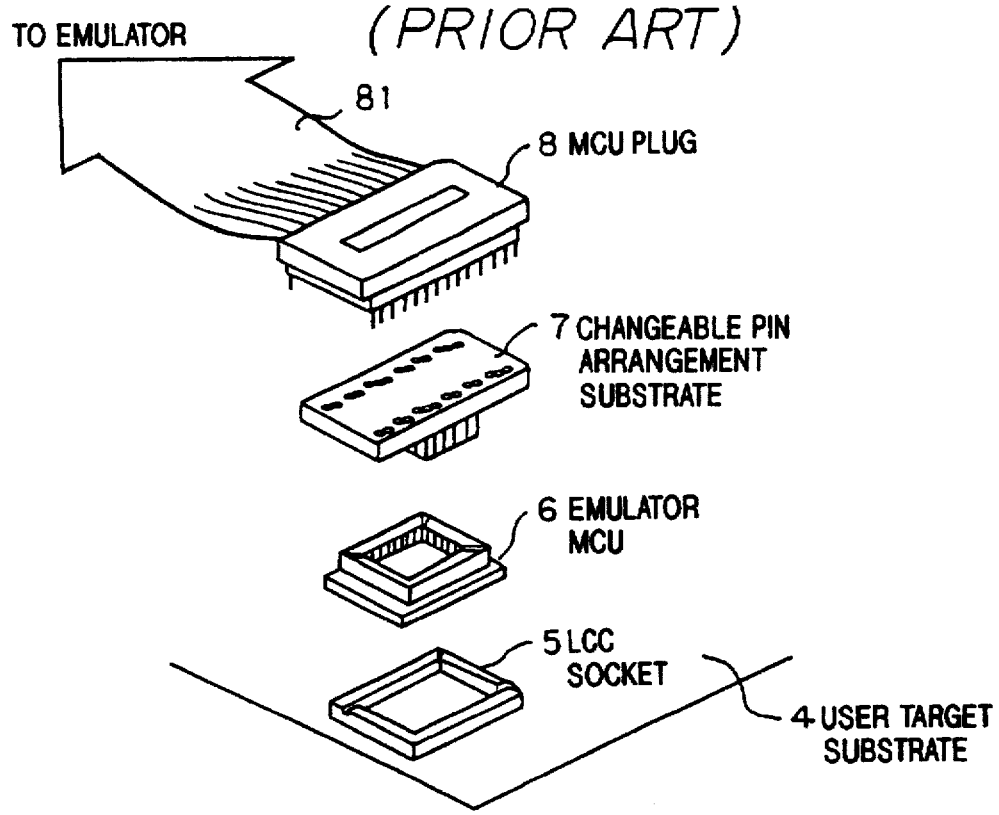
FIG. 2 is a perspective view of a conventional emulator MCU showing a case wherein an emulator is connected to the emulator MCU by using a changeable pin arrangement substrate.
Figure 3:
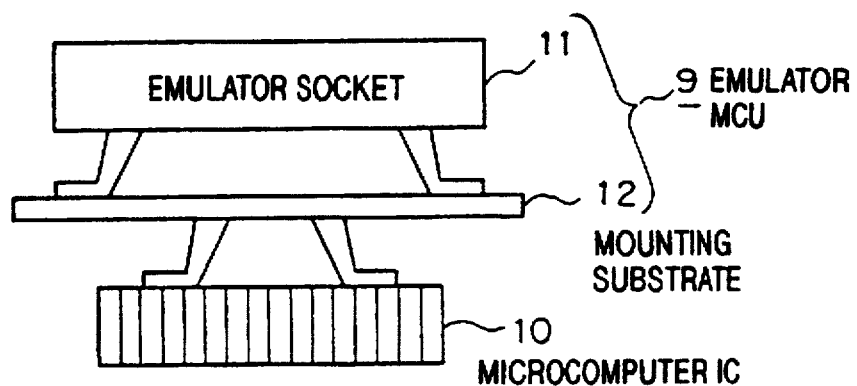
FIG. 3 is a side view showing a conventional emulator MCU with a socket mount substrate.
Figure 4:
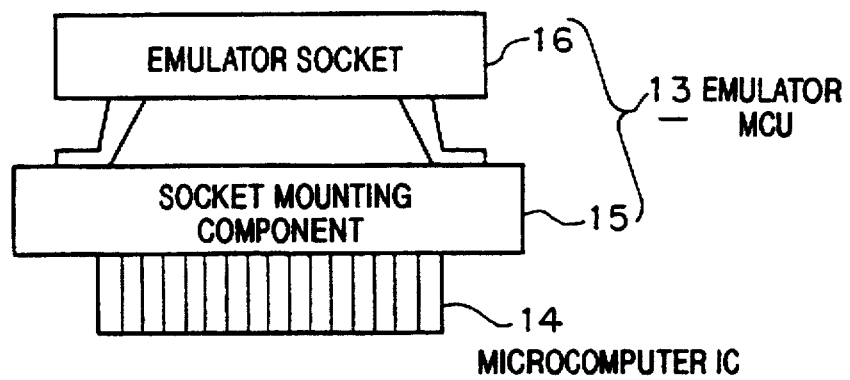
FIG. 4 is a side view showing an emulator MCU in which another component whose size is greater in surface area than the size of the upper surface section of a microcomputer IC in area is mounted on the microcomputer IC.
Figure 5:
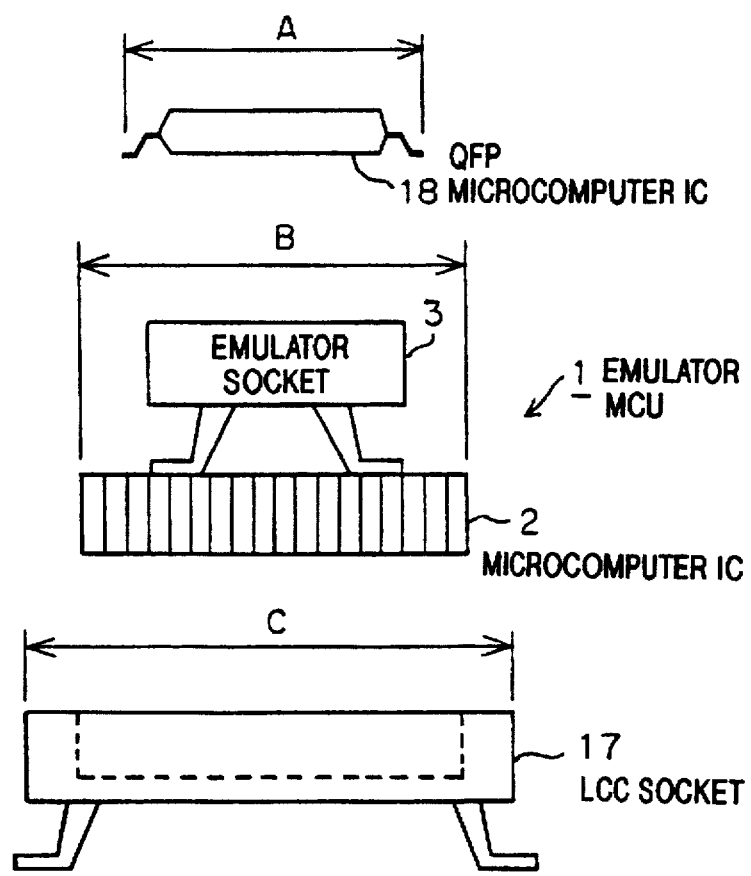
FIG. 5 is a diagram showing the relationship between the width of the conventional emulator MCU as shown in FIG. 1, the width of a conventional LCC socket, and the width of a conventional QFP microcomputer IC mounted during a final operation test in order to evaluate programs.
Figure 6:
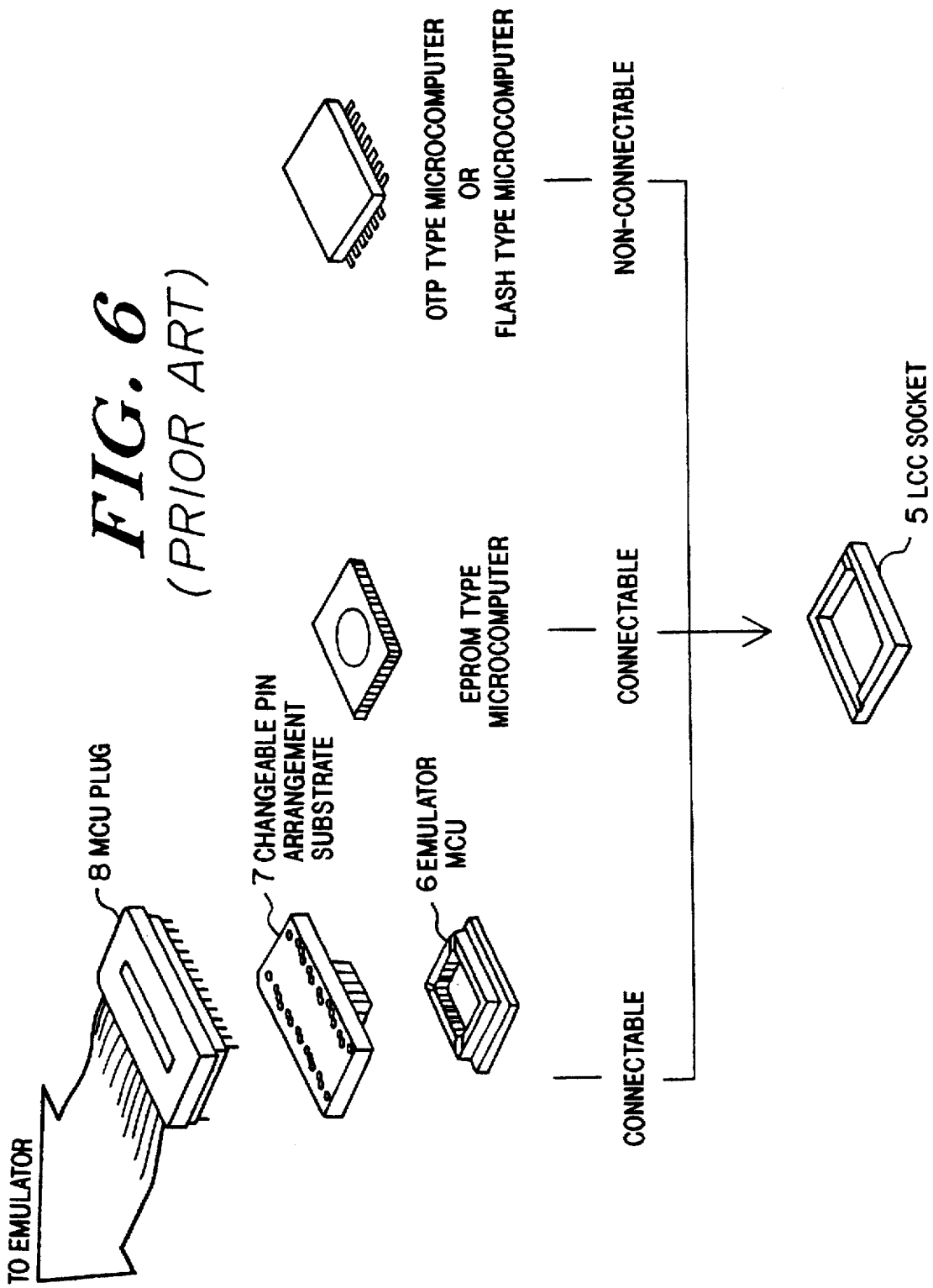
FIG. 6 is a diagram showing connection possibility states between various types of conventional microcomputers, a convention emulator MCU and a conventional LCC socket.
Figure 7:
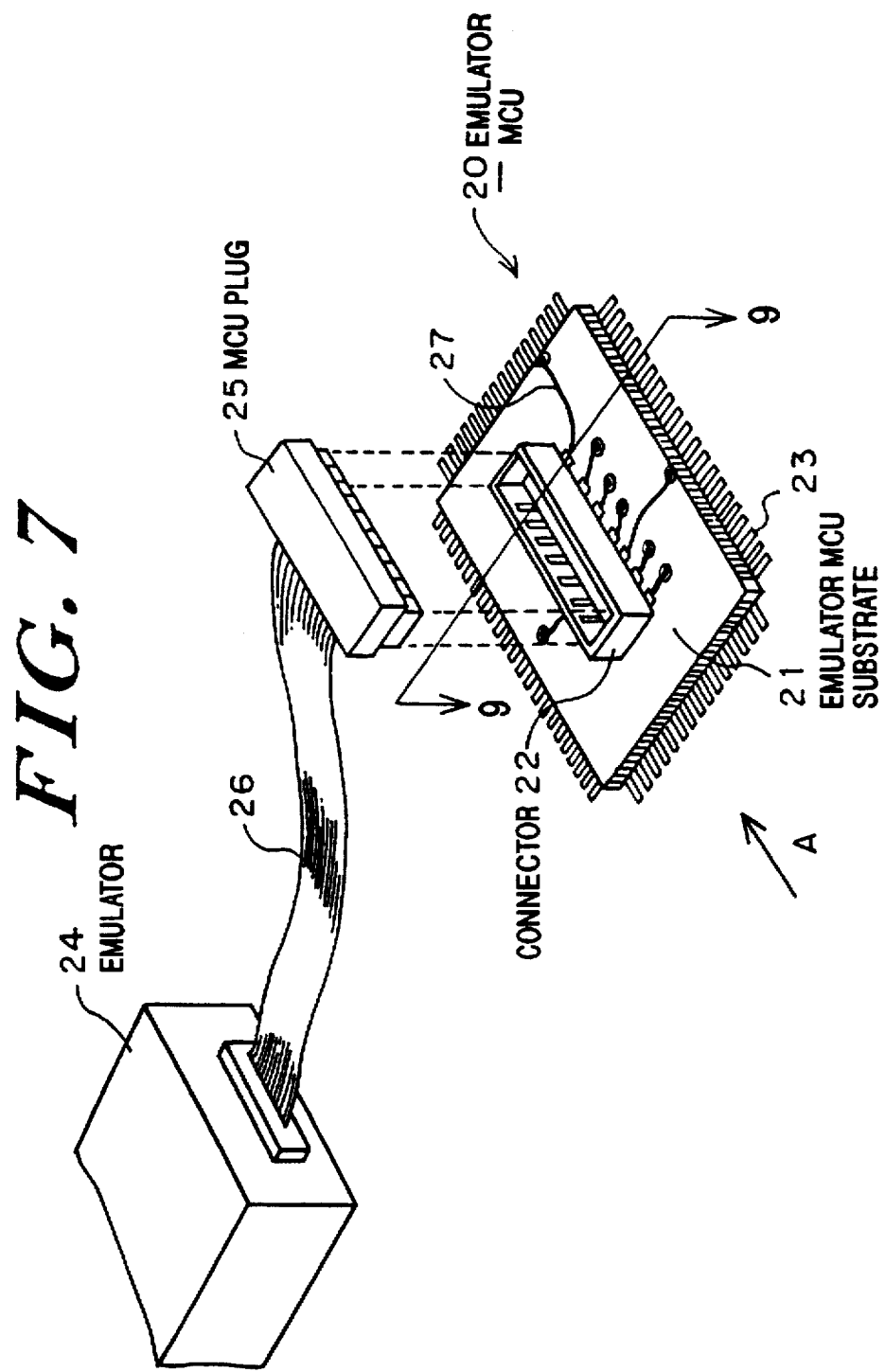
FIG. 7 is a perspective view showing an emulator and an emulator MCU in accordance with the first embodiment of the present invention.

FIG. 7 is a perspective view showing an emulator and a microcomputer unit for use in an emulator (or an emulator MCU) in accordance with the first embodiment of the present invention.

In the diagram, a reference number 20 designates an emulator MCU, reference number 21 denotes a substrate that comprises a glass epoxy material (referred to as "an emulator MCU substrate"), reference number 22 indicates a connector mounted on the surface of the substrate 21, reference number 23 designates L type pins placed on the side surfaces of the substrate 20, reference number 24 designates an emulator, reference number 25 indicates an MCU plug to be connected to the connector 22 for the emulator MCU 20, reference number 26 indicates a flat cable connecting the emulator 24 to the MCU plug 25, and reference number 27 designates printed wiring on the substrate 21.

Figure 8:
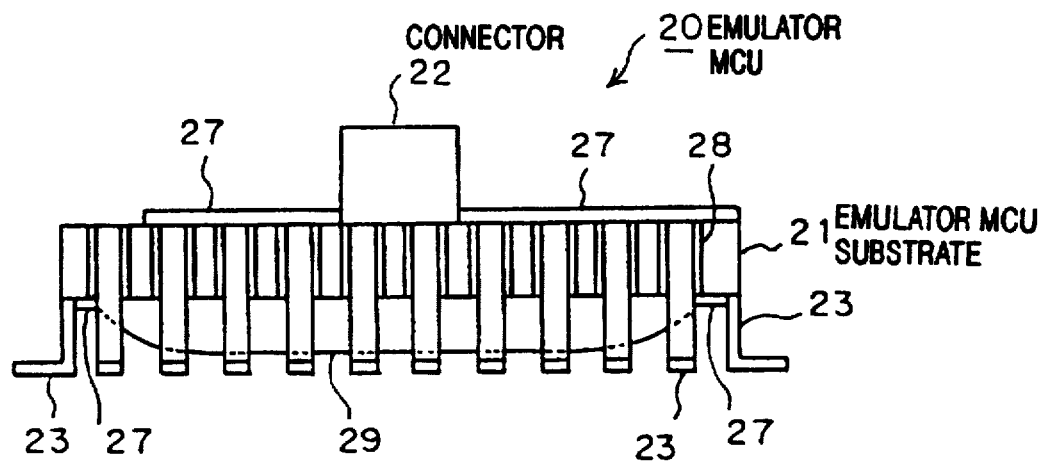
FIG. 8 is a side view of the emulator MCU observed from the arrow A side as shown in FIG. 7.

FIG. 8 is a side view of the emulator MCU observed from the arrow A side as shown in FIG. 7. The components that are used in FIG. 7 will be designated by the same reference numbers and the explanation of them is omitted here.

In the diagram, reference number 28 designates semi-cylindrical shaped through-holes and reference number 29 denotes a coating material coating the microcomputer IC 31.

Figure 9:
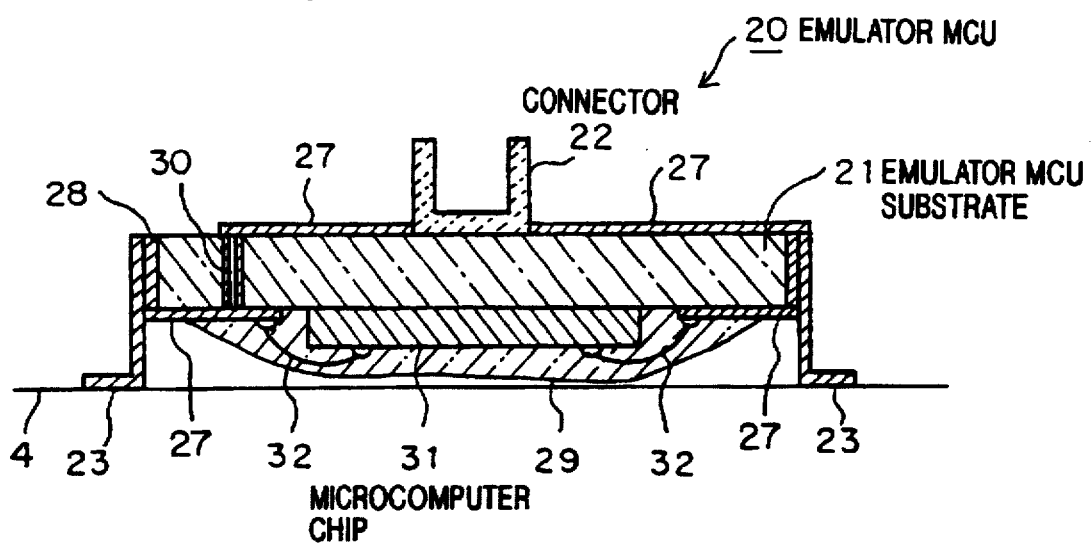
FIG. 9 is a sectional view of the emulator MCU along the B—B line as shown in FIG. 7.

FIG. 9 is a sectional view of the emulator MCU 20 along the B—B line as shown in FIG. 7. The components that are used in FIGS. 7 and 8 will be designated by the same reference numbers and the explanation of them is omitted here.

In the diagram, reference number 30 designates through-holes for electrically connecting the printed wiring 27 of both the upper surface (a second surface mounting area) and the lower surface (a first surface mounting area) of the substrate 21 to each other. Reference number 31 denotes a microcomputer chip, reference number 32 indicates binding wires for electrically connecting the microcomputer chip 31 to the printed wiring 27. As shown in FIGS. 8 and 9, the connector 22 is mounted on the upper surface of the substrate 21 and the microcomputer chip 31 is placed on the lower surface of the substrate 21. In addition, the microcomputer chip 31 and the bonding wires 32 are sealed with and protected by the coating material 29.

Figure 10:
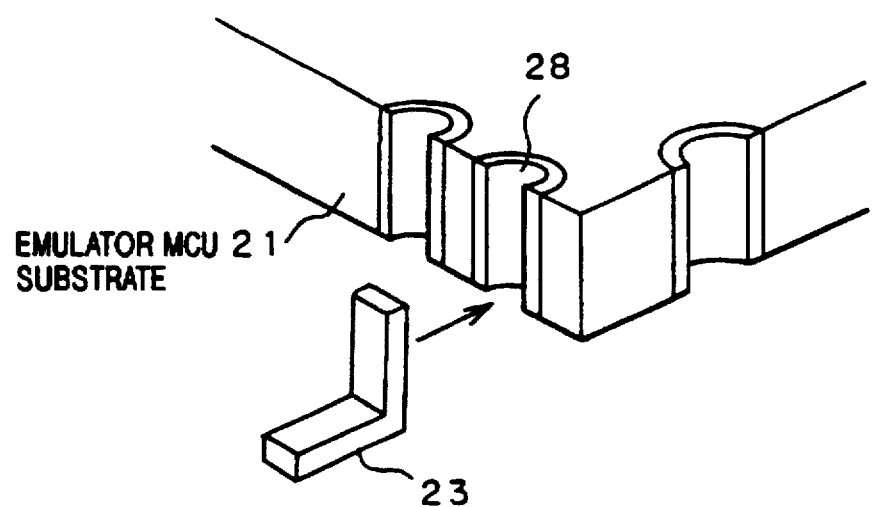
FIG. 10 is a perspective view showing a part of the connection state between L shaped pins and semi-cylindrical shaped through-holes as shown in FIGS. 7 to 9.

FIG. 10 is a perspective view showing a part of the connection state between the L shaped pins (a plurality of electrical connection terminals) and semi-cylindrical shaped through-holes as shown in FIGS. 7 to 9. The components that are used in FIG. 7 will be designated by the same reference numbers and the explanation of them is omitted here.

As shown in FIG. 10, the L shaped pins 23 are placed and fixed in each hollow section of each semi-cylindrical shaped through-hole 28 by soldering. In FIG. 10, although only one L shaped pin is shown, like the case shown in FIG. 10, all of the L shaped pins are connected to the hollow sections of the semi-cylindrical shaped through holes.

In addition, the microcomputer chip 31 is electrically connected to the L shaped pins through the printed wiring 27 and also connected to the connector 22 in order to transfer debugging signals to the emulator for the debugging operation through the printed pins 27. The microcomputer chip 31 is electrically connected to the connector 22 via through-holes 30. Further, when the connection points of the microcomputer chip 31 and the connector 22 are also connected to the L shaped pins, it may be acceptable to electrically connect them to the microcomputer chip 31 and the connector 22 through the semi-cylindrical shaped through-holes 28.

In addition, the foot prints of the substrate 21, the emulator MCU 20 and the L shaped pins 23 are formed so that these foot prints are equal to the foot prints of the microcomputer IC that is used in the final test operation. This is one of the important aspects of the present invention.

For example, there are one-time programmable microcomputers (hereinafter referred to as "OTP microcomputers") or flash type microcomputers as the microcomputer IC that is used during the final test operation. The QFP socket 33a is used to mount these OPT microcomputers.

Next, the operation of the emulator MCU of the first embodiment will be explained.

Figure 11:
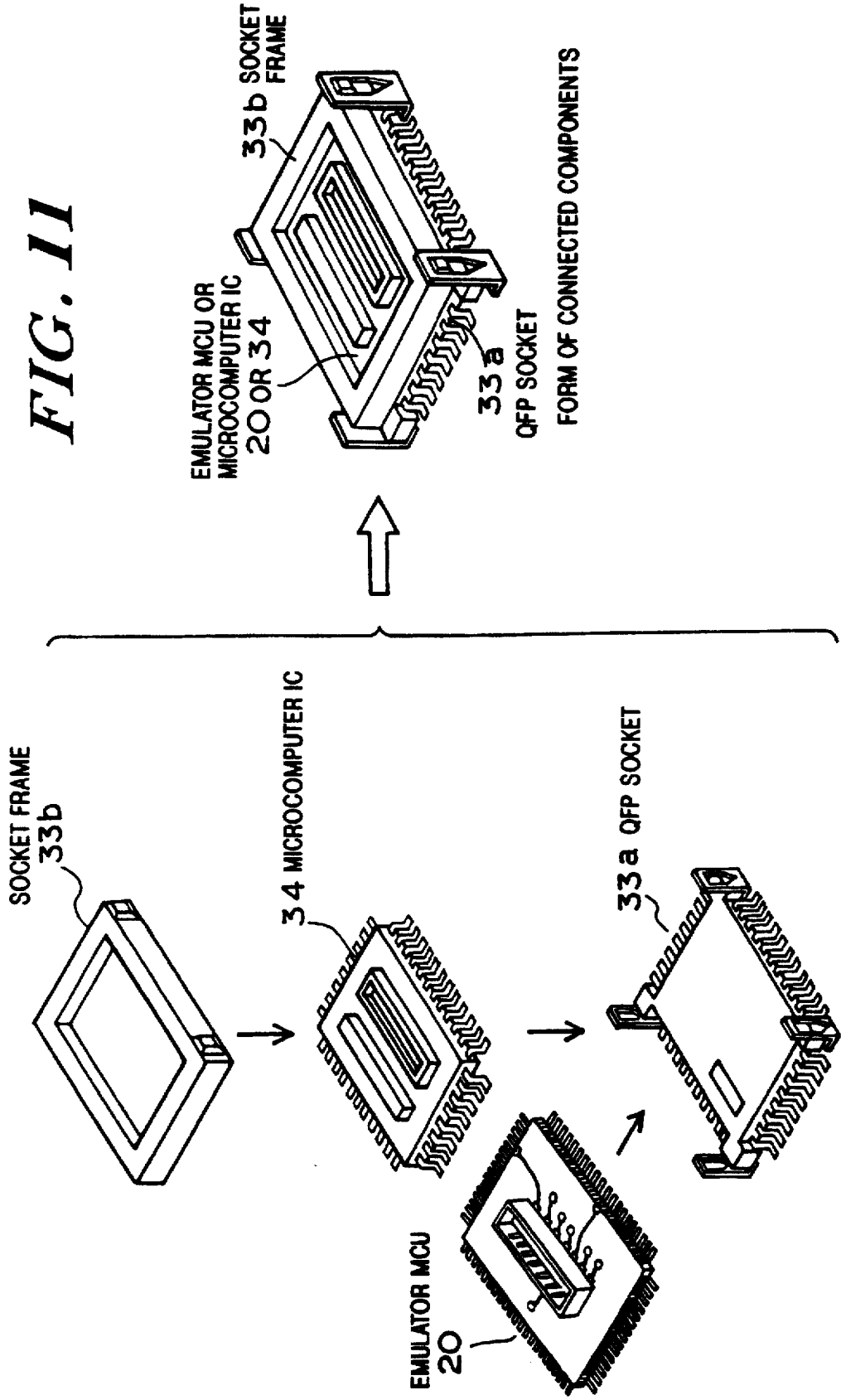
FIG. 11 is a perspective view showing a QFP socket and a socket frame for electrically connecting to a QFP type microcomputer IC or an emulator MCU according to an aspect of the present invention.

FIG. 11 is a perspective view showing the QFP socket 33a and the socket frame 33b for electrically connecting the QFP type microcomputer IC 34 (or also for connecting the emulator MCU 20) which is temporarily mounted on the QFP socket 33a and showing the connected state. The QFP socket 33a holding the microcomputer IC to be debugged is mounted on the user-target substrate (not shown). The emulator MCU 20 is mounted on the QFP socket 33a in order to perform program development or to execute program evaluation operations. The MCU plug 25 is plugged into the socket 22 of the emulator MCU 20. Thereby, the debugging signals or information may be transferred to the emulator 24 while the debugging operation for the microcomputer chip 31 is performed.

When users ascertain that the desired operations of the emulator MCU 20 are performed correctly, the users take away the emulator MCU 20 from the QFP socket 33a and then mount the OTP type microcomputer or the flash type microcomputer on the QFP socket 33a in order to perform the final test operation to evaluate the operation. If operation errors occur in this final test operation, the OTP type microcomputer or the flash type microcomputer is taken away from the QFP socket 33a, and then the emulator MCU 20 is mounted again on the QFP socket 33a in order to perform the debugging operation.

In addition, each of the emulator MCU 20 and the flash type microcomputer IC is put between the QFP socket 33a and the socket frame 33b.

Figure 12:
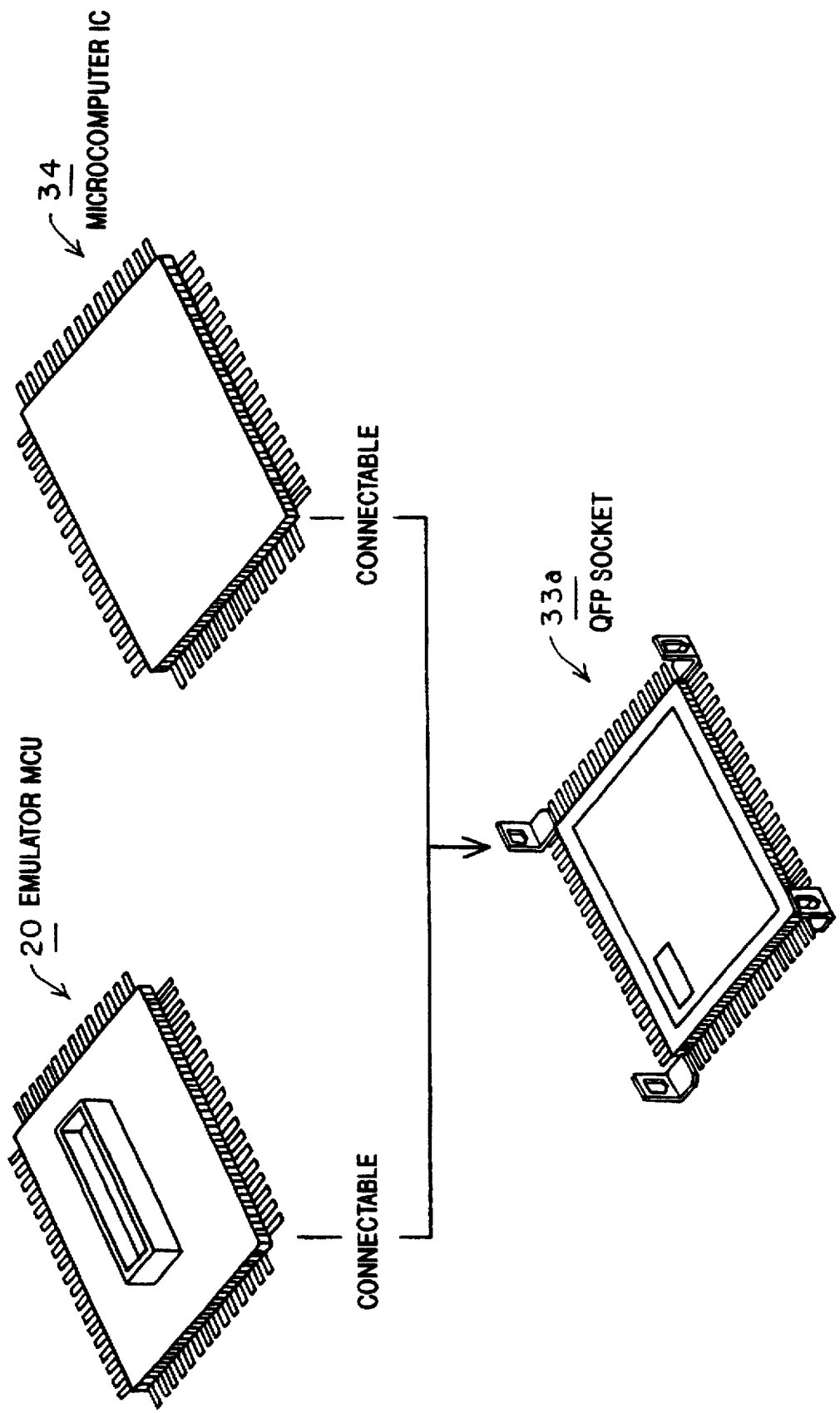
FIG. 12 is a diagram showing the possibility of mounting the emulator MCU of the first embodiment and the microcomputer IC for use in the final test operation on a QFP socket.

FIG. 12 is an explanation diagram showing the possibility of mounting the emulator MCU 20 of the first embodiment and the microcomputer IC 34 (for example, the OTP type microcomputer or the flash type microcomputer and the like) used for the final test operation on the QFP socket.

As shown in the diagram, in this first embodiment, because the emulator 20 and the OTP type microcomputer IC and the flash type microcomputer IC for the final test operation can be switched and mounted on the QFP socket 33a, the emulator MCU 20 can be easily mounted again on the QFP socket 33a without removing the QFP socket 33a itself, and then the program debugging operation can be easily initiated by the emulator MCU 20 even if the operation errors occur.

In addition, by using the emulator MCU substrate 21 that is made of glass epoxy material having the semi-cylindrical shaped through-holes 28, it can be easily achieved at low manufacturing cost to manufacture the emulator MCU 20 whose foot pattern is equal to the foot pattern of the microcomputer IC for use in the final test operation.

Furthermore, it can be acceptable to mount ROMs on the emulator MCU 20. In this case, memory contents stored in the ROMs can be erased by using ultra-violet light or can be electrically erased.

Embodiment 2

Figure 13:
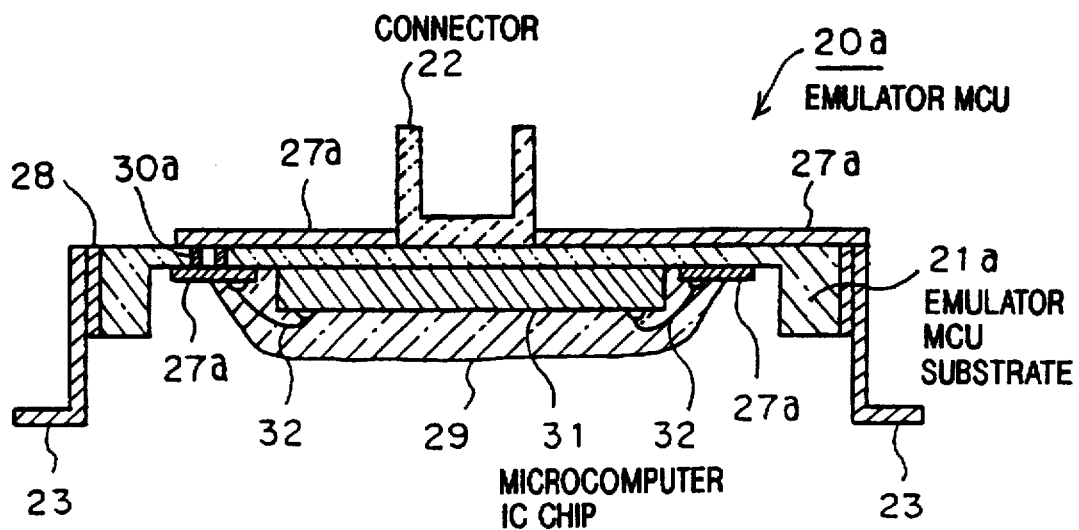
FIG. 13 is a sectional view of emulator MCU in accordance with the second embodiment of the present invention.

FIG. 13 is a sectional view in accordance with an emulator MCU of the second embodiment according to the present invention.

A perspective view for the emulator MCU 20a of the second embodiment is identical to the perspective view of the emulator MCU 20 of the first embodiment. That is, FIG. 13 is a sectional diagram of the B—B line as shown in FIG. 7. In addition, the components that are used in FIG. 9 will be designated by the same reference numbers and the explanation of them is omitted here.

In FIG. 13, reference character 20a designates an emulator MCU (a microcomputer unit for use in an emulator), 21a denotes an emulator MCU substrate (or a substrate for brevity) that comprises glass epoxy material having a concave section at the center of the lower surface of the substrate. Reference character 27a designates printed wiring placed on the upper surface section and the lower surface section of the substrate 21a for electrically connecting the connector 22, the microcomputer IC chip 31, and the L shaped pins 23 to each other, reference character 30a indicates through-holes penetrating through the emulator MCU substrate 21a for electrically connecting the printed wiring 27a at the upper surface and the lower surface of the substrate 21a. In this second embodiment, the microcomputer IC chip 31 is bonded at the lower surface of the substrate 21a by the coating material 29.

That is, the difference between the emulator MCU 20a of the second embodiment and the emulator MCU 20 of the first embodiment is that the lower surface of the substrate 21a in the emulator MCU 20a of the second embodiment has the concave section at the center section thereof and the microcomputer IC chip 31 is placed in this concave section and sealed and covered with the coating material 29.

By using the configuration of the emulator MCU 20a of the second embodiment, the height of the emulator MCU 20a becomes lower than that of the emulator 20 of the first embodiment, so that the center of gravity of the emulator MCU 20a can be set at a lower point. This configuration of the emulator MCU 20a in accordance with the second embodiment provides the advantages of miniaturization and stability.

Because the operation flows for debugging operation in the emulator MCU 20a of the second embodiment is identical to that of the emulator MCU 20 of the first embodiment, the explanation for them is therefore omitted here.

Embodiment 3

Figure 14:
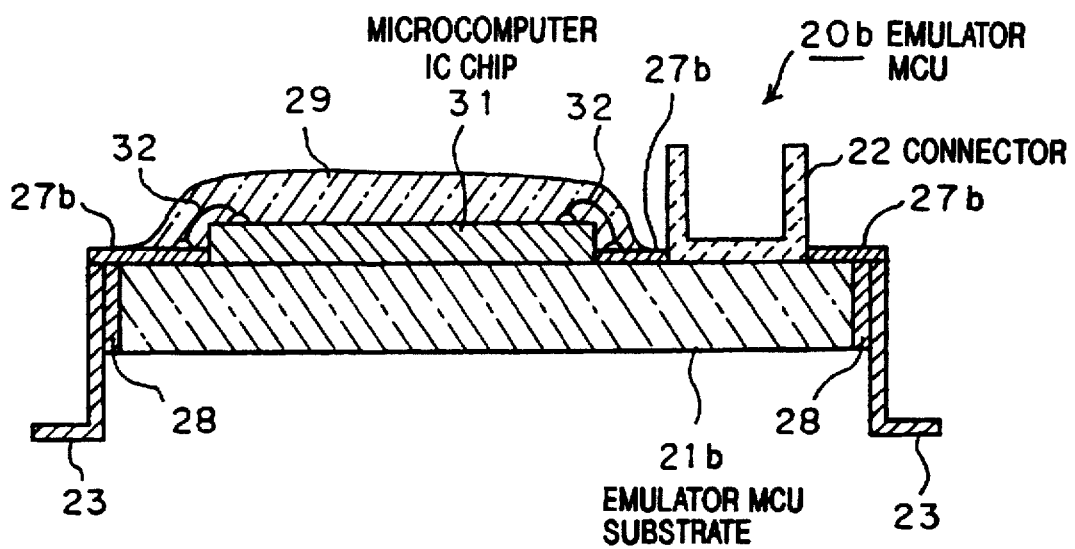
FIG. 14 is a sectional view of an emulator MCU in accordance with the third embodiment of the present invention.

FIG. 14 is a sectional view in accordance with an emulator MCU of the third embodiment according to the present invention.

A perspective view of the emulator MCU 20b of the third embodiment is identical to the perspective view of the emulator MCU 20 of the first embodiment. That is, FIG. 14 is a sectional diagram of the B—B line shown in FIG. 7 for the emulator MCU 20b of the third embodiment. In addition, the components that are used in FIG. 9 will be designated by the same reference numbers and the explanation of them is omitted here.

In FIG. 14, reference character 20b designates an emulator MCU 20b (microcomputer unit for use in an emulator), reference character 21b denotes an emulator MCU substrate (or a substrate for brevity) that comprises glass epoxy material, reference character 27b indicates printed wiring for electrically connecting the connector 22, the microcomputer chip 31 and the L shaped pins 23. Further, the microcomputer chip 31 and the connector 22 are mounted on the upper surface section of the substrate 21b in the emulator MCU 20b of the third embodiment.

That is, the difference between the emulator MCU 20b of the third embodiment and the emulator MCU 20 of the first embodiment is that the microcomputer IC chip 31 and the connector 22 are mounted on the upper surface of the substrate 21b in the emulator 20b of the third embodiment. In addition, the microcomputer IC chip 31, the connector 22 and the L shaped pins 23 are electrically connected by the printed wiring on the upper surface section of the substrate 21b. By using the configuration of the emulator MCU 20b of the third embodiment, it may be possible to form the printed substrate only one surface section side of the substrate, not both surface section sides, so that the manufacturing cost of the emulator MCU 20b can be reduced.

In addition, in cases that there are many output terminals of the microcomputer IC chip 31 and there is no adequate space for the printed wiring, it is acceptable to form printed wiring on both the upper surface section and the lower surface section in the substrate 21b, like the emulator MCU 20 of the first embodiment as shown in FIG. 9. In this case, it can be also acceptable to electrically connect the printed wiring on both the upper surface and the lower surface of the substrate 21b through the through-holes 30.

In addition, because the operation flow in order to perform debugging operations in the emulator MCU 20b of the third embodiment is equal to that of the emulator MCU 20 of the first embodiment, the explanation is therefore omitted here.

As described above in detail, in the emulator MCU of the present invention, because the emulator MCU has the configuration so that a microcomputer IC chip and a connector to electrically connect to an emulator can be mounted on the surface of the emulator MCU substrate and the arrangement of the foot print of a plurality of electric connection terminals (L shaped pins) in the emulator MCU is equal to the arrangement of the foot print of a microcomputer IC, a common socket can be used for both the microcomputer IC chip and the emulator MCU. Thereby, a program evaluation operation and a program debugging operation can easily perform even if an operation error is detected and these operations are repeated.

In addition, in the emulator MCU of the present invention, because the emulator MCU is formed so that a microcomputer IC chip is mounted only on the first surface mounting section of an emulator MCU substrate that is facing a user target substrate and a connector for use in an emulator is mounted on the second surface mount section of the emulator MCU substrate that is not facing to the user target substrate side when the emulator MCU is connected to the user target substrate, both surface mounting sections of the emulator MCU substrate can be effectively used and the miniaturization of a system including the emulator MCU of the present invention can be achieved.

Further, in the emulator MCU of the present invention, because both a microcomputer IC chip and a connector for an emulator are mounted on the second surface mounting section of an emulator MCU substrate that is not facing to a user target substrate when the emulator MCU is connected to the user target substrate, there is the effect that a printed circuit board of the emulator MCU can be formed on one surface of the substrate and the manufacturing cost of the printed board can be reduced.

Moreover, in the emulator MCU of the present invention, because a microcomputer IC chip is placed in a concave section of an emulator MCU substrate, there are effects that the height of the emulator MCU substrate can be reduced and the center of gravity of the emulator MCU can be lower.

In addition, in the emulator MCU of the present invention, because a plurality of semi-cylindrical through-holes whose foot print corresponds to the foot print of the microcomputer IC are formed around a peripheral section of an emulator MCU substrate to mount the emulator MCU and a plurality of L shaped pins are electrically connected to the plurality of semi-cylindrical through-holes to each other, the emulator MCU can be easily manufactured at low manufacturing cost.

Furthermore, in the emulator MCU of the present invention, because an ultra-violet erasable ROM is used as a microcomputer IC chip mounted on an emulator MCU substrate in the emulator MCU, EPROM type microcomputer units can be used as the microcomputer IC for used in an emulator when a transparent coating material is used, and the emulator MCU can be easily manufactured at low manufacturing cost.

In addition, by using the emulator MCU of the present invention, when a microcomputer IC chip having an electrically erasable ROM is used as the microcomputer IC chip to be mounted on an emulator MCU substrate, reading and writing operations from and to the electrically erasable ROM can be performed through a connector mounted on the emulator MCU substrate. Thereby, the operations based on programs can be checked while mounting the microcomputer IC chip and without removing the emulator MCU from a user target substrate, the efficiency of the debugging operations in program development can be increased, and the debugging operation time can also be decreased.

Although the present invention has been described and illustrated in detail, it is clearly understood that the same is by way of illustration and example only and is not to be taken by way of limitation, the spirit and scope of the present invention being limited only by the scope of the appended claims.

What is claimed is:

1. An emulator microcomputer unit for connecting a target substrate to an emulator to transfer debugging signals to the emulator and comprising:

an emulator microcomputer unit substrate having a plurality of electrical connection terminals, the emulator microcomputer unit substrate having an outer periphery equal in size to an outer periphery of a target microcomputer integrated circuit chip to be mounted on a target substrate;

a test microcomputer integrated circuit chip for performing an operation equivalent to an operation of the target microcomputer integrated circuit chip, the test microcomputer integrated circuit chip being mounted on the emulator microcomputer unit substrate;

a connector mounted on the emulator microcomputer unit substrate for electrically connecting the emulator to the test microcomputer integrated circuit chip; and printed wiring on the emulator microcomputer unit substrate for electrically connecting the plurality of electrical connection terminals, the test microcomputer integrated circuit chip, and the connector.

2. The emulator microcomputer unit as claimed in claim 1, wherein the emulator microcomputer unit substrate includes first and second surface mount sections, the first surface mount section facing the target substrate and the second surface mount section facing away from the target substrate when the emulator microcomputer unit substrate is connected to the target substrate, and wherein the test microcomputer integrated circuit chip is mounted on the first surface mount section and the connector is mounted on the second surface mount section.

3. The emulator microcomputer unit as claimed in claim 1, wherein the emulator microcomputer unit substrate includes first and second surface mount sections, the first surface mount section facing the target substrate and the second surface mount section facing away from the target substrate when the emulator microcomputer unit substrate is connected to the target substrate, and wherein the test microcomputer integrated circuit chip and the connector are mounted on the second surface mount section.

4. The emulator microcomputer unit as claimed in claim 1, wherein the test microcomputer integrated circuit chip comprises at least one of an electrically erasable read only memory and a read only memory erasable with ultraviolet light.

5. The emulator microcomputer unit as claimed in claim 2, wherein the first surface mount section has a concave section and the test microcomputer integrated circuit chip is mounted in the concave section.

6. The emulator microcomputer unit as claimed in claim 2, wherein the outer periphery of the emulator microcomputer substrate includes a plurality of semi-cylindrical through-holes, the plurality of electrical connection terminals of the emulator microcomputer unit substrate comprises a plurality of L-shaped pins electrically connected to the plurality of semi-cylindrical through-holes, and a foot print defined by the plurality of electrical connection terminals corresponds to a foot print defined by a plurality of electrical connection terminals of the target microcomputer integrated circuit chip.

7. The emulator microcomputer unit as claimed in claim 2, wherein the test microcomputer integrated circuit chip comprises at least one of an electrically erasable read only memory and a read only memory erasable with ultraviolet light.

8. The emulator microcomputer unit as claimed in claim 2, wherein the emulator microcomputer unit substrate includes a plurality of wiring through-holes extending from the first surface mount section to the second surface mount section and wherein the test microcomputer integrated circuit chip is electrically connected to the connector through the wiring through-holes.

9. The emulator microcomputer unit as claimed in claim 3, wherein the outer periphery of the emulator microcomputer substrate includes a plurality of semi-cylindrical through-holes, the plurality of electrical connection terminals of the emulator microcomputer unit substrate comprises a plurality of L-shaped pins electrically connected to the plurality of semi-cylindrical through-holes, and a foot print defined by the plurality of electrical connection terminals corresponds to a foot print defined by a plurality of electrical connection terminals of the target microcomputer integrated circuit chip.

10. The emulator microcomputer unit as claimed in claim 3, wherein the test microcomputer integrated circuit chip comprises at least one of an electrically erasable read only memory and a read only memory erasable with ultraviolet light.

11. The emulator microcomputer unit as claimed in claim 5, wherein the outer periphery of the emulator microcomputer substrate includes a plurality of semi-cylindrical through-holes, the plurality of electrical connection terminals of the emulator microcomputer unit substrate comprises a plurality of L-shaped pins electrically connected to the plurality of semi-cylindrical through-holes, and a foot print defined by the plurality of electrical connection terminals corresponds to a foot print defined by a plurality of electrical connection terminals of the target microcomputer integrated circuit chip.

12. The emulator microcomputer unit as claimed in claim 5, wherein the test microcomputer integrated circuit chip comprises at least one of an electrically erasable read only memory and a read only memory erasable with ultraviolet light.

13. The emulator microcomputer unit as claimed in claim 5, wherein the emulator microcomputer unit substrate includes a plurality of wiring through-holes extending from the first surface mount section to the second surface mount section and wherein the test microcomputer integrated circuit chip is electrically connected to the connector through the wiring through-holes.

14. The emulator microcomputer unit as claimed in claim 5, wherein the emulator microcomputer unit substrate includes a plurality of wiring through-holes extending from the first surface mount section to the second surface mount section and wherein the test microcomputer integrated circuit chip is electrically connected to the connector through wiring through-holes.

15. An emulator microcomputer unit for connecting a target substrate to an emulator to transfer debugging signals to the emulator and comprising:

an emulator microcomputer unit substrate having an outer periphery and including:
a plurality of semi-cylindrical through-holes;
a plurality of electrical connection terminals comprising a plurality of L-shaped pins electrically connected to the semi-cylindrical through-holes, wherein a foot print defined by the plurality of electrical connection terminals of the emulator microcomputer unit substrate is equal in size to a foot print defined by a plurality of electrical connection terminals of a target microcomputer integrated circuit chip mountable on the target substrate;

a test microcomputer integrated circuit chip for performing an operation equivalent to an operation of the target microcomputer integrated circuit chip, the test microcomputer integrated circuit chip being mounted on the emulator microcomputer unit substrate;

a connector mounted on the emulator microcomputer unit substrate for connecting the emulator to the test microcomputer integrated circuit chip; and printed wiring located on the emulator microcomputer unit substrate for electrically connecting the plurality of electrical connection terminals, the test microcomputer integrated circuit chip and the connector.

16. The emulator microcomputer unit as claimed in claim 15, wherein the test microcomputer integrated circuit chip comprises at least one of an electrically erasable read only memory and a read only memory erasable with ultraviolet light.

17. The emulator microcomputer unit as claimed in claim 15, wherein the emulator microcomputer unit substrate comprises a glass epoxy material.

* * * * *

UNITED STATES PATENT AND TRADEMARK OFFICE
CERTIFICATE OF CORRECTION

PATENT NO. : 5,768,497
DATED : June 16, 1998
INVENTOR(S) : Uemura et al.

It is certified that error appears in the above-identified patent and that said Letters Patent is hereby corrected as shown below:

Column 11, Line 39, change "5" to --15--.

Signed and Sealed this

Fifteenth Day of December, 1998

Attest:

BRUCE LEHMAN

Attesting Officer

Commissioner of Patents and Trademarks